United States Patent [19]
Keiser

[11] Patent Number: 5,851,617
[45] Date of Patent: Dec. 22, 1998

[54] ARTICLES INCLUDING MICROCELLULAR FOAM MATERIALS AS COMPONENTS THEREOF

[75] Inventor: LeRoy H. Keiser, Darien, Ill.

[73] Assignee: Rexam Release, Inc., Oak Brook, Ill.

[21] Appl. No.: 675,352

[22] Filed: Jul. 3, 1996

[51] Int. Cl.$^6$ ..................................................... B32B 7/06
[52] U.S. Cl. ..................... 428/41.8; 283/100; 428/40.1; 428/41.4; 428/41.5; 428/41.9; 428/202; 428/315.5; 428/315.7; 428/315.9; 428/317.9; 428/352
[58] Field of Search ................... 428/41.8, 41.9, 428/41.5, 41.4, 202, 352, 315.5, 40.1, 315.7, 315.9, 317.9; 283/100

[56] References Cited

U.S. PATENT DOCUMENTS

| | | | |
|---|---|---|---|
| 3,665,918 | 5/1972 | Lindquist | 128/156 |
| 4,321,297 | 3/1982 | Adelman | 428/238 |
| 4,377,616 | 3/1983 | Ashcraft | 428/213 |
| 4,473,665 | 9/1984 | Martini-Vvedensky et al. | 521/79 |
| 4,525,416 | 6/1985 | Hammerschmidt | 428/315.9 |
| 4,623,392 | 11/1986 | Ou-Yang | 106/27 |
| 4,743,488 | 5/1988 | Jones | 428/198 |
| 4,823,945 | 4/1989 | Adelman | 206/204 |
| 5,034,171 | 7/1991 | Kiczek et al. | 264/51 |
| 5,057,169 | 10/1991 | Adelman | 156/71 |
| 5,158,986 | 10/1992 | Cha et al. | 521/82 |
| 5,160,674 | 11/1992 | Colton et al. | 264/50 |
| 5,232,756 | 8/1993 | Chang | 428/40 |
| 5,334,356 | 8/1994 | Baldwin et al. | 422/133 |

FOREIGN PATENT DOCUMENTS

| | | |
|---|---|---|
| 0 191 003 | 8/1986 | European Pat. Off. . |
| 645 845 | 10/1984 | Switzerland . |

*Primary Examiner*—Nasser Ahmad
*Attorney, Agent, or Firm*—Bell Seltzer Intellectual Property Law Group of Alston & Bird LLP

[57] ABSTRACT

The invention is directed to a variety of articles which include a sheet of microcellular foam material. Exemplary articles include release liner sheets, face stock, label stock, and the like. The cell density of the sheet of microcellular foam material lies in a range from about $10^9$ to about $10^{15}$ cells per cubic centimeter of the sheet, and the average size of the cells is less than about 10 microns. The invention also provides processes for the manufacture of articles which include a sheet of microcellular foam material as a component thereof.

14 Claims, 1 Drawing Sheet

ARTICLES INCLUDING MICROCELLULAR FOAM MATERIALS AS COMPONENTS THEREOF

FIELD OF THE INVENTION

This invention relates to sheet materials, and more particularly to sheet materials which include a foamed material as a component, and to processes for making the same.

BACKGROUND OF THE INVENTION

Polymer coated and uncoated paper sheets, as well as polymer films, have been widely used as reinforcing or carrier substrates for a variety of products, such as release liner sheets, face stock, label stock, and the like. Paper and polymer film substrates are sufficient for many applications.

For many applications, however, particularly in graphic arts, these types of products must exhibit dimensional stability upon exposure to changes in ambient moisture (or relative humidity) for the best performance. For example, signage for use on the sides of vehicles, in store windows, and the like, can be provided from vinyl sheet materials. The vinyl sheets typically have a design element on a front surface thereof and an adhesive on a rear surface, with a release liner sheet overlying the adhesive. If the release liner is not dimensionally stable upon changes in ambient moisture, heat, and the like, this can adversely affect the appearance of the signage by affecting color and/or shape registrations.

Paper substrates typically are not dimensionally stable upon exposure to changes in ambient moisture. For example, the edges of the paper substrate can curl, and/or the substrate as a whole can become wavy. As a result, the substrate can lose lay-flat properties required to maintain the proper alignment or registration of the design elements.

Polymer films have much better dimensional stability when exposed to changes in moisture, but can be much more expensive than paper substrates. However, polymer films can be dimensionally unstable and exhibit reduction in tensile properties at elevated temperatures, and therefore some polymer film substrates are unsuited for certain applications where elevated temperatures are encountered during the manufacturing process or in use.

SUMMARY OF THE INVENTION

In the present invention, composite sheet materials, release liner sheets, face stock, and label stock are provided which include as a component thereof microcellular foam sheet materials. The resulting foam materials can achieve a cell density of several hundred trillions of voids per cubic centimeter and an average void or cell size of less than about 10 microns, preferably less than about 5 microns, and more preferably less than 1 micron, and less. In addition, the cell distribution is substantially uniform throughout the foamed material.

Composite sheet materials, release liner sheets, face stock, label stock, and the like which include microcellular foam sheet materials can exhibit excellent dimensional stability and physical properties under varying conditions of moisture, temperature, and the like, in contrast to conventional paper and polymer film substrates. Further, the use of microcellular foam materials in the articles of the invention can provide economies of manufacture of those articles, as compared to articles which include polymer films. For example, foam sheets can require less polymer starting material than unfoamed polymer films. Yet despite the decreased amount of polymer, as well as reduced density of such foams, the physical properties of the articles of the invention typically are not substantially weakened or decreased, as compared to the material content of the product. Indeed, in some cases, the articles of the invention can exhibit an enhancement of physical properties. For example, the articles of the invention can exhibit excellent flexibility, strength, toughness, lay-flat, and die cuttability.

In one embodiment of the invention, a composite sheet material is provided. The composite sheet material includes a substrate, an adhesive layer adhered to a surface of the substrate, and a release liner sheet releasably adhered to the adhesive layer. The release liner sheet includes a sheet of microcellular foam material having release properties on a surface thereof. The microcellular foam material includes a plurality of cells distributed throughout the sheet with a cell density from about $10^9$ to about $10^{15}$ cells per cubic centimeter of each sheet. The foamed sheet also preferably has a density from about 0.1 to about 0.95 grams per cubic centimeter and a thickness from about 0.5 to about 100 mils.

To impart release properties to the sheet of microcellular foam material, a release material is provided on a surface on the microcellular foamed sheet. The release material can include any of the types of agents known in the art which provide release properties, such as fluoropolymers, silicones, chromium complexes modified long chain fatty acids, and the like. In a preferred embodiment of the invention, the release material includes a curable silicone release agent.

The substrate of the composite sheet materials can be selected from any of the types of substrates known in the art, including polymeric substrates, cellulosic substrates, metal foils, metallized paper, metallized film, and substrates including both polymeric and cellulosic components, for example, sheets formed of a mixture of synthetic and cellulosic staple fibers. The substrate can also be a second sheet of microcellular foam material as described above. The adhesive preferably is a pressure sensitive adhesive.

In another embodiment of the invention, a release liner sheet is provided as described above, i.e., a sheet of microcellular foam material having a plurality of cells distributed substantially throughout the sheet, the cell density of the cells lying in a range from about $10^9$ to about $10^{15}$ cells per cubic centimeter, the average size of the cells being less than about 10 microns; and a release material on a surface of the sheet of microcellular foam material.

In yet another embodiment of the invention, a face sheet is provided. In this aspect of the invention, the face sheet includes a substrate formed of a sheet of microcellular foam material as described above having an adhesive on a front surface thereof. The adhesive is preferably a pressure sensitive adhesive. In addition, advantageously a rear surface of the substrate opposite the adhesive layer is receptive to printed indicia.

The present invention further provides label stock. The label stock includes face stock of the invention as described above (i.e., a sheet of microcellular foam material having an adhesive on a surface thereof) in combination with a release liner. The release liner is releasably adhered to a surface of the adhesive layer opposite the foam sheet material. The release liner can be selected from any of the release liner materials known in the art. Optionally, the release liner may also includes a sheet of microcellular foam material as described above in combination with a release material on a surface thereof.

The present invention also includes processes for making the composite sheet materials, release liner sheets, face stock and label stock of the invention. Microcellular foam sheet components may prepared as known in the art by supplying a supercritical fluid to the polymer material to be foamed. The supercritical fluid saturates the polymer to form an effectively saturated solution of the fluid and the polymer. When the fluid/polymer solution contains a sufficient amount of supercritical fluid at a suitable temperature and pressure, the temperature and/or pressure of the fluid/polymer system is rapidly changed to induce a thermodynamic instability and a foamed polymer is produced. The foamed polymer can then be directed to additional manufacturing steps to produce the various articles of the invention which incorporate the foam materials as a component.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

The present invention will now be described more thoroughly hereinafter with reference to the accompanying drawings, in which illustrative embodiments of the invention are shown. This invention may, however, be embodied in many different forms and should not be construed as limited to the embodiments set forth herein. Rather, this embodiment is provided so that the disclosure will be thorough and complete, and will convey fully the scope of the invention to those skilled in the art. Like numbers refer to like elements throughout. For purposes of clarity, the scale has been exaggerated.

Figure 1:
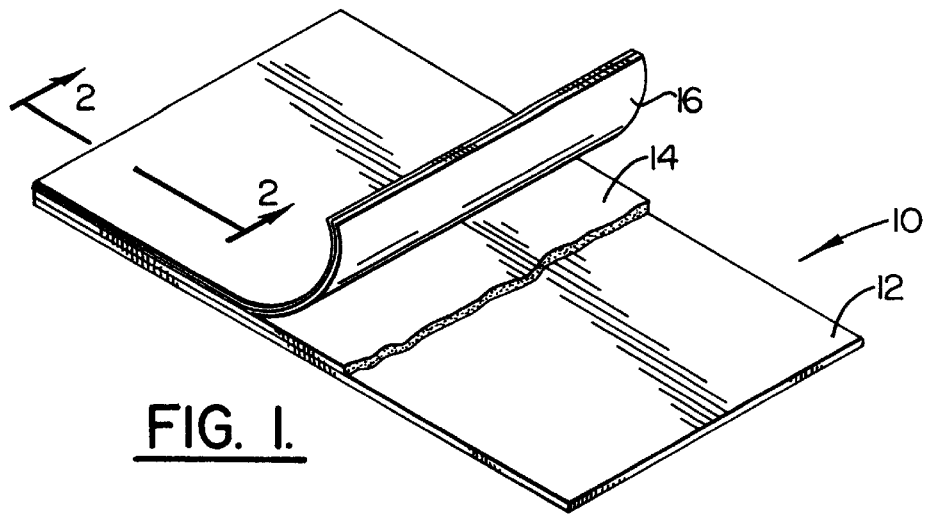
FIG. 1 is a schematic perspective view showing a composite sheet material in accordance with the present invention with the respective layers of the composite sheet material being exposed for clarity of illustration.

FIG. 1 is a schematic perspective view of a composite sheet material designated generally as 10 in accordance with the present invention. In FIG. 1, the respective layers of the composite sheet material 10 are cut away or exposed for clarity of illustration. Generally, composite sheet material 10 includes a substrate 12, an adhesive layer 14 adhered to a surface of substrate 12, and a release liner sheet 16 overlying and releasably adhered to adhesive layer 14 such that adhesive layer 14 is sandwiched between substrate 12 and release liner sheet 16.

Substrate 12 can be any of the types of substrates as known in the art, including, without limitation, polymeric substrates, such as polymer films (including metallized films), polymer foams, sheets formed of synthetic staple fibers and/or filaments, and the like; cellulosic substrates, such as paper substrates (including metallized paper), woven, knit, netted or nonwoven fabric substrates formed of natural fibers and/or filaments, and the like; substrates including both polymeric and cellulosic components, for example, sheets formed of a blend or mixture of synthetic and cellulosic staple fibers and/or filaments; metal foils; and the like.

Adhesive layer 14 can be formed of various suitable conventional adhesives known in the art, preferably a pressure sensitive adhesive. Pressure sensitive adhesives in dry form (substantially solvent free except for residual solvent) are typically aggressively and permanently tacky at room temperature (e.g., from about 15° to about 25° C.) and firmly adhere to a variety of surfaces upon contact without the need for more than manual pressure. Such adhesives typically do not require activation by water, solvent or heat to exert a strong adhesive holding force towards materials such as paper, glass, plastics, wood, and metals.

Exemplary pressure sensitive adhesives include rubber-resin materials, polyolefins, acrylics, polyurethanes, polyesters, polyamides, and silicones. The pressure sensitive adhesive may be solvent-coatable, hot-melt coatable, radiation curable (for example, by electron beam or ultraviolet radiation), and water based emulsion type adhesives, all as well known in the art. Specific examples of pressure sensitive adhesives include polyolefin-based polymers and copolymers, such as ethylene vinyl acetate copolymers; acrylic-based adhesives, such as isooctyl acrylate/acrylic acid copolymers and tackified acrylate copolymers; tackified rubber-based adhesives, such as tackified styrene-isoprene-styrene block copolymers, tackified styrene-butadiene-styrene block copolymers and nitrile rubbers, such as acrylonitrile-butadiene; and silicone-based adhesives, such as polysiloxanes.

Non-pressure sensitive adhesives, such as thermally activated adhesives, solvent activated adhesives, and the like can also be used.

The adhesive may be substantially non-tacky at room temperature if it becomes tacky at an elevated temperature at which it is intended to be applied. Alternatively, the adhesive may be nontacky to the touch but aggressively cohesive with other substrates.

Adhesive layer 14 can be a single layer of a suitable adhesive material; alternatively, adhesive layer 14 can include multiple layers of adhesive materials. Adhesive layer 14 can also be a substantially continuous or discontinuous layer.

Figure 2:
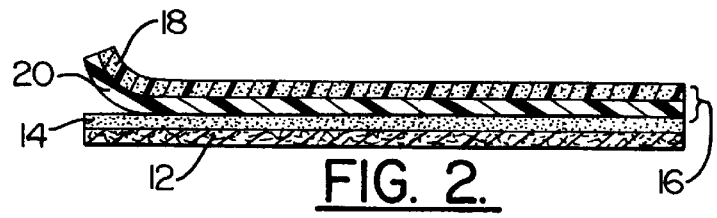
FIG. 2 is a cross-sectional view of the composite sheet material taken along line 2—2 of FIG. 1 and illustrates a release liner sheet in accordance with the present invention.

The components of the release liner sheet 16 of the invention are illustrated in FIG. 2, which is a cross-sectional view of the composite sheet material 10 of FIG. 1 taken along line 2—2. Release liner sheet 16 includes a support layer 18 and a release layer 20. In this embodiment of the invention, support layer 18 is a sheet of microcellular foamed material which includes a plurality of cells distributed substantially throughout the sheet. Further, the cell density of the cells in the sheet is from about $10^9$ to about $10^{15}$ cells per cubic centimeter of the sheet. Still further, the average size of the cells of the microcellular foam material 18 is less than about 10 microns, and preferably less than about 5 microns and, more preferably, less than about 1 micron. In addition, the foam materials have the capability of providing a wide range of void fraction percentages from very high void fractions (low material densities) up to 90%, or more, to very low void fractions (high material densities) down to 20% or less. Advantageously, foam sheet 18 has a density from about 0.10 to about 0.95, preferably about 0.3 to 0.7, grams per cubic centimeter (g/cc), and a thickness from about 0.5 to about 100 mils, preferably about 1 to 50 mils, more preferably about 2 to 20 mils. The surface of the sheet of microcellular foam material can be smooth or patterned.

Microcellular foam materials useful in accordance with the present invention are known in the art, and are described in, for example, U.S. Pat. Nos. 5,334,356; 5,158,986; 5,034,171; 5,160,674; and 4,473,665, the entire disclosure of each of which is incorporated herein by reference. Illustrative techniques for the manufacture of microcellular foam materials and products of the invention incorporating the same are described in more detail below. Generally, the microcellular foam materials are formed by using supercritical fluids, e.g., gases in their supercritical state, as a foaming agent in a polymeric material. Exemplary supercritical fluids include carbon dioxide ($CO_2$), nitrogen, argon, helium, and the like in their supercritical state.

The supercritical fluid saturates the polymer to form a saturated solution of the fluid and the polymer at a first pressure and temperature. When the fluid/polymer solution contains a sufficient amount of supercritical fluid at an initial suitable temperature and pressure, the temperature and/or pressure of the fluid/polymer system is rapidly changed to induce a thermodynamic instability and a foamed polymer is produced. The resulting foamed material can achieve a cell density of several hundred trillions of voids per cubic centimeter and an average void or cell size of less than 10 microns, in some cases less than 5, and still further in some cases less than 1 micron.

Polymeric materials capable of being foamed in accordance with the invention are preferably liner sheet 16 of the invention, for example, 30 to about 3000 nanometers thick.

A surface of foam material 18 of release liner 16 opposite release layer 20 advantageously is receptive to printed indicia. Corona treatment can also be used to promote adhesion of printed indicia to a surface of sheet 18. This can be useful in applications wherein the release liner sheet is branded or labeled, for example, to indicate a source of labels produced therefrom, as described below.

Figure 3:
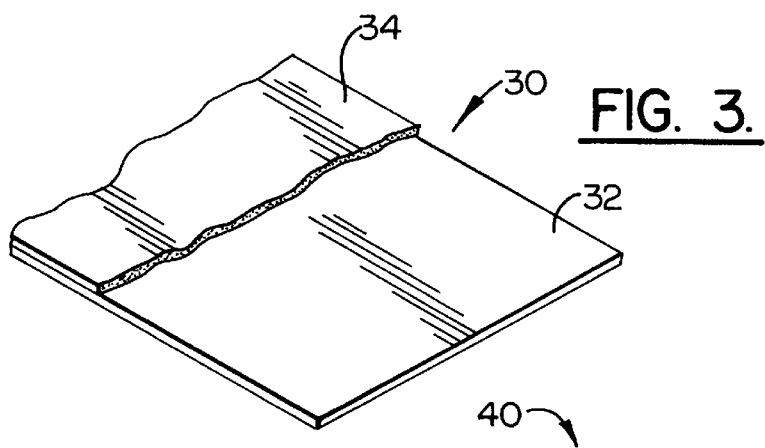
FIG. 3 is a schematic perspective view showing a face sheet material in accordance with the present invention with the respective layers of the face sheet material being exposed for clarity of illustration.

Turning now to FIG. 3, another aspect of the invention is illustrated, namely, a face stock material designated generally as 30. Face stock materials are known in the art and generally can be described as any of the types of sheet materials or substrates known in the art with an adhesive layer on a surface thereof, which can be mounted or releasably adhered to a release liner.

As illustrated in FIG. 3, face stock 30 includes a supporting or carrier substrate 32 and an adhesive layer 34 overlying and adhered to substrate 32. In this embodiment of the invention, substrate 32 is a sheet of microcellular foam material as described above, i.e., having a cell density from about $10^9$ to about $10^{15}$ cells per cubic centimeter, an average cell size of less than about 10 microns, a density from about 0.10 to about 0.95 g/cc, and a thickness from about 0.5 to about 100 mils. The surface of the sheet of microcellular foam material can be smooth or patterned. Adhesive layer 34 can be any of the types of adhesive layers as described above, and preferably is a pressure sensitive adhesive layer.

Advantageously, a surface of substrate 32 of face stock 30 opposite adhesive layer 34 is rendered receptive to printed indicia, i.e., inks. Printed indicia can be applied to the surface of substrate 32 prior to or subsequent to its use, for example, prior polyethylene)/polydimethyl siloxane copolymers, which include polyolefin as the majority component (80 to 99% polyolefin).

In a preferred embodiment of the invention, the microcellular foam material is a polyolefin foam material formed by using carbon dioxide at supercritical conditions (i.e., above about 1,100 pounds per square inch (psi) and 39° C.).

Various additives, pigments, dispersing aids, adhesion promoters, lubricants, fillers, antioxidants, and the like mananometery be added to the thermoplastic polymer prior to foaming. For example, the polymer can be blended with fillers such as talc, calcium carbonate, or other fillers prior to foaming.

Release layer 20 can include any of the types of agents known in the art which impart release properties to a substrate. For example, release layer 20 can be a coating of a release agent, such as a fluoropolymer, silicone, chromium complexes of long chain fatty acids and the like. Typically, such release agents are cured by any of several ways, such as by heat, by electromagnetic radiation, such as ultraviolet (UV), electron beam, and the like, by moisture, and the like, as known in the art. Release layer 20 can also be cured by evaporative processes as known in the art, i.e., dried to remove solvent. Exemplary release agents include SYL-OFF 294® with Dow CORNING® 176 catalyst, commercially available from Dow Corning; UV9315 with UV9310C catalyst, commercially available from General Electric Silicones; and Quilon, commercial available from E.I. dupont. Corona treatment can advantageously be used to promote adhesion of the release agent to the surface of sheet 18.

Release layer 18 has a thickness sufficient to impart the desired release properties of the release thermoplastic polymers, including both amorphous and semi-crystalline polymers. In addition, thermoplastic polymers which can be cross-linked upon exposure to electromagnetic radiation (ultraviolet, electron beam, and gamma radiation) can also be used. Exemplary thermoplastic polymers include, but are not limited to, polyolefins, such as polyethylene, polypropylene, polymethylpentene, polyolefins based on metallocene or single site catalysts, and copolymers thereof; vinyl polymers and copolymers, such as polyvinylchloride (PVC), polystyrene, including syndiotactic polystyrene, and the like; acrylate polymers such as polymers and copolymers of acrylic acid and methacrylic acid and their amides, esters, salts and corresponding nitrites; polyamides; polyesters and copolyesters; polycarbonates; polycycloalkenes; copolymers of carbon dioxide and ethylene; polyamideimides; polyether ether ketones; and blends, alloys, copolymers, and grafted copolymers of these and other thermoplastic polymers, such as acrylonitrile-butadienestyrene (ABS). The thermoplastic polymer is selected based upon the desired physical and chemical properties of the resultant microcellular foam material.

Suitable thermoplastic materials also include thermoplastic polymers modified to impart release properties thereto. For example, a suitable thermoplastic polymer can be blended or copolymerized with an appropriate release material. The resultant blend or copolymer can be used as the majority component of the foam sheet, or as a blending or alloying component in combination with other thermoplastic materials. Suitable modifying agents capable of imparting release properties include siloxanes, such as, but not limited to, polydimethyl siloxane, which can migrate or bloom to the surface of a substrate to provide release properties thereto. Suitable copolymers include polyolefin (such as to or subsequent to application of the face sheet to a substrate surface. The surface can also be embossed, colored, metalized or otherwise decorated. The surface of substrate 32 can be rendered receptive to printed indicia using techniques known in the art, such as corona treatment of the substrate surface, application of an additional layer to the substrate surface which is receptive to printed indicia, and the like.

Face sheet 30 can be used in combination with a release liner sheet releasably adhered to adhesive layer 34 to form a composite structure, such as that illustrated in FIG. 1. The composite structure resulting from the combination of face stock 30 with a release liner sheet is particularly useful as label stock, i.e., a sheet material from which a plurality of individual labels having a predetermined size and shape can be provided.

In this aspect of the invention, any of the types of release liner sheets known in the art can be used in combination with face stock 30 to form label stock. The release liner sheet can be, for example, a release liner sheet 16 as illustrated in FIG. 2, i.e., a support layer 18 formed of a sheet of microcellular foamed material as described above in combination with a release layer 20, wherein the release layer is disposed between adhesive layer 34 and support layer 18. Label stock in accordance with the present invention, however, can include other release liners as known in the art in combination with face stock 30. Exemplary release liner materials include, but are not limited to, polymer films, optionally coated with a silicone or other release agent; paper sheets advantageously having a polymer (such as polyethylene) coating covered with a release agent such as silicone; and the like.

Figure 4:
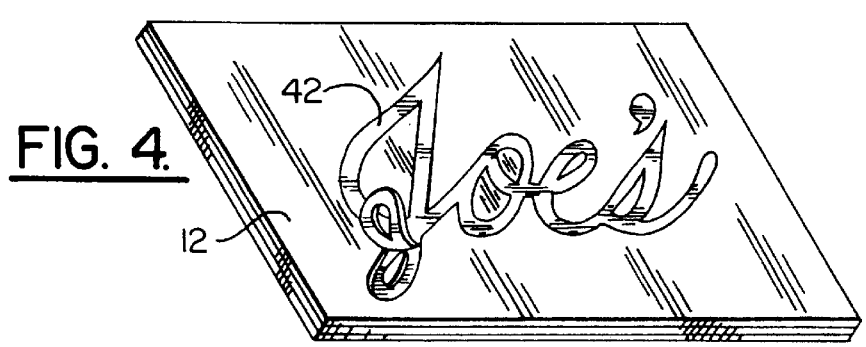
FIG. 4 is a schematic perspective view of label stock in accordance with the present invention.

FIG. 4 illustrates schematically one such use of label stock in accordance with the present invention, namely, label stock useful in the graphic arts industry. Label stock 40 is formed from a composite sheet material, such as that illustrated in FIG. 1 (i.e., includes a substrate 12, an adhesive layer 14 adhered to a surface of substrate 12, and a release liner sheet 16 overlying and releasably adhered to adhesive layer 14 such that adhesive layer 14 is sandwiched between substrate 12 and release liner sheet 16) In FIG. 4, a design or indicia 42 is printed onto the front surface of substrate 12, such as a vinyl sheet material, opposite adhesive layer 14 of the composite material of FIG. 1. Substrate 12 can be cut or perforated about the perimeter of the design to allow the design 42 and adhesive on a rear surface thereof to be easily pulled away and removed from the release liner material, as indicated. The design and adhesive on a rear surface thereof can be applied to a surface as desired. The label stock can also be in other forms, for example, as a supply of roll labels, sheet labels, and the like.

The use of microcellular foam materials as support or carrier substrates in the release liner sheets, face sheets, and label stock of the present invention can result in a variety of desirable characteristics. Because a foamed material is used as a component in place of polymer films, paper substrates, and the like, manufacturing costs, such as the cost of resin, can be reduced. The microcellular foam materials can also impart physical properties comparable to and in some cases better than the properties exhibited by products which incorporate polymer films, paper sheets, etc, i.e., can have excellent flexibility, strength, toughness, lay-flat, and die cuttability. Further, the articles of the invention are substantially dimensionally stable upon exposure to changes in moisture, temperature, and the like, thus rendering the articles particularly useful in graphic arts applications.

The skilled artisan will appreciate that although preferred embodiments of the invention, i.e., release liner sheets, face sheets, and label stock, have been described above, the present invention is directed generally to the use of microcellular foam sheet materials as a components in any of the types of products which typically include a support or carrier substrate. In addition, the microcellular foam sheet materials are also useful as components in liner-less labels, as known in the art.

The microcellular foam materials used in this and other aspects of the invention can be prepared using batch or continuous processing techniques as known in the art, for example, those techniques described in U.S. Pat. Nos. 5,334,356; 5,158,986; 5,034,171; 5,160,674; and 4,473,665, referenced above. Preferably, for economies of manufacturing, the microcellular foam material and the various products of the invention which incorporate the foam material are manufactured in a continuous process.

The microcellular foam sheet materials can be formed using supercritical fluids, e.g., gases in their supercritical state. Generally, a supercritical fluid (for example, carbon dioxide, above about 1,100 pounds per square inch (psi) and 39° C.) is introduced into a molten polymer material within an extruder barrel. Sufficient supercritical carbon dioxide is supplied so as to form a molten fluid/polymer material in which the polymer is effectively saturated with supercritical fluid.

The molten fluid/polymer material exits the extruder barrel to a sheet die, which forms a sheet of the fluid/polymer material. This material is supplied to a pressurized chamber. The pressure in the chamber is maintained at a level lower than that at the extruder barrel exit. As the pressure drops upon entering of the fluid/polymer material into the chamber, cell nucleation occurs within the material. The fluid/polymer material can then be supplied to foaming heaters to achieve cell expansion and completion of the foaming process. The foamed polymer material can be annealed, e.g., for crystallization of the foamed polymer if desired by annealing heaters.

Alternatively, a series of pressure chambers can be used, the pressure within each of which is selected to subject the sheet material to a pressure differential as the sheet material passes from one chamber to the next. Cell expansion occurs as polymer material exits one chamber having a first pressure into the other chamber which is set to an even lower pressure chamber, e.g., at ambient pressure, so that the completely foamed polymer material is obtained at that point. In such an operation, foaming (i.e., cell nucleation and cell expansion) takes place substantially solely due to the pressure differentials which occur in the system, in contrast to the process wherein cell nucleation occurs due to the pressure differential in a chamber and cell expansion occurs due to the temperature differential at heaters.

After the foamed polymer material exits the chamber, the foam sheet material can be stored in roll form for subsequent use. Alternatively, the foamed sheet material can be directed to additional manufacturing steps, such as the production of composite sheet materials, release liners, face stock, and label stock of the invention.

For example, to produce release liners of the invention, a release material can be applied to a surface of the foamed sheet material using conventional apparatus and techniques, and subsequently cured, as needed. Alternatively, a release agent can be mixed or copolymerized with the polymer prior to foaming, and the resultant foamed sheet material subjected to conditions sufficient to cause the release agent to bloom or migrate to a surface of the microcellular foam material to impart release properties to a surface thereof.

The resultant release liner sheet can be stored in roll form for subsequent use, or alternatively, thereafter directed to additional manufacturing steps, such as the manufacture of composite sheet materials of the invention. In this regard, an adhesive, preferably a pressure sensitive adhesive, can be deposited onto the surface of the release liner sheet having release properties. Conventional techniques and apparatus can be used to form the release liner/adhesive structure.

The release liner/adhesive structure can thereafter be directed into face-to-face relationship with a suitable substrate to form a release liner/adhesive/substrate structure. The substrate can be any of the substrates referenced above, including a second sheet of microcellular foam material. This structure can be then directed through a suitable pressure nip, such as that formed by two rolls, to press the layers together for good interply adhesion. The resultant composite sheet material can be stored in roll form, or directed to additional in-line processing, for example, to manufacture label stock therefrom using known techniques and apparatus.

To manufacture face sheets of the invention, a coating of an adhesive, preferably a pressure sensitive adhesive, can be directly applied to an upper surface of microcellular foam material using conventional techniques and apparatus. As the skilled artisan will appreciate, however, for many applications, adhesive is not directly applied to the substrate but rather is applied using adhesive transfer techniques as described above, i.e., by applying adhesive first to a release liner sheet, which is then joined to the substrate.

The invention has been described in considerable detail with reference to its preferred embodiments. However, it will be apparent that numerous variations and modifications can be made without departure from the spirit and scope of the invention as described in the foregoing detailed specification and defined in the appended claims.

That which is claimed is:

1. A release liner sheet consisting essentially of:
   a sheet of microcellular foam material having a plurality of cells distributed substantially uniformly throughout said sheet, the cell density of said cells in said sheet lying in a range from about $10^9$ to about $10^{15}$ cells per cubic centimeter and the average size of said cells being less than about 10 microns; and
   a release material on a surface of said sheet.

2. The release liner sheet of claim 1, wherein said sheet of microcellular foam material has a density from about 0.10 to about 0.95 grams per cubic centimeter and a thickness from about 0.5 to about 100 mils.

3. The release liner sheet of claim 2, wherein said sheet of microcellular foam material has a density from about 0.3 to about 0.7 grams per cubic centimeter and a thickness from about 1 to about 50 mils.

4. The release liner sheet of claim 1, wherein the average size of said cells is less than about 5 microns.

5. The release liner sheet of claim 4, wherein the average size of said cells is less than about 1 micron.

6. The release liner sheet of claim 1, wherein said release material comprises a release agent selected from the group consisting of fluoropolymers, silicones and chromium complexes of long chain fatty acid.

7. The release liner sheet of claim 1, wherein said microcellular foam material comprises a thermoplastic polymer.

8. The release liner sheet of claim 7, wherein said thermoplastic polymer is selected from the group consisting of polyolefins; vinyl polymers; acrylate polymers; polyamides; polyesters; polycarbonates; polycycloalkenes; copolymers of carbon dioxide and ethylene; and blends, alloys, and copolymers thereof.

9. The release liner sheet of claim 8, wherein said thermoplastic polymer is polypropylene, polyethylene, polymethylpentene, polystyrene, syndiotactic polystyrene or a blend or copolymer thereof.

10. The release liner sheet of claim 9, wherein said thermoplastic polymer is syndiotactic polystyrene.

11. The release liner sheet of claim 8, wherein said thermoplastic polymer is a copolymer of a release agent with said thermoplastic polymer.

12. The release liner sheet of claim 11, wherein said copolymer comprises polydimethyl siloxane as a release agent.

13. A release liner sheet comprising:
   a sheet of microcellular foam material having a plurality of cells distributed substantially uniformly throughout said sheet, the cell density of said cells in said sheet lying in a range from about $10^9$ to about $10^{15}$ cells per cubic centimeter and the average size of said cells being less than about 10 microns, said microcellular foam material comprising a copolymer of a release agent with a thermoplastic polymer; and
   a release material on a surface of said sheet.

14. The release liner sheet of claim 13, wherein said copolymer comprises polydimethyl siloxane as a release agent.

* * * * *